United States Patent [19]

Coleman, Jr.

[11] Patent Number: 4,912,799

[45] Date of Patent: Apr. 3, 1990

[54] WATER MAIN SCRAPER

[76] Inventor: Lewis E. Coleman, Jr., 1650 Schooner La., Hanover Park, Ill. 60103

[21] Appl. No.: 303,119

[22] Filed: Jan. 30, 1989

[51] Int. Cl.[4] .......................... B08B 9/02; B23D 79/00

[52] U.S. Cl. ................................ 15/104.04; 29/81.02; 29/81.1; 29/81.11

[58] Field of Search ........... 15/104.04, 236.01, 236.05, 15/236.06, 236.08; 29/81 F, 81 E, 81 G

[56] References Cited

U.S. PATENT DOCUMENTS 1,283,070 10/1918 Callender ........................ 15/104.04
3,214,824 11/1965 Brown ........................ 15/104.04 X
4,750,249 6/1988 Richardson ........................ 29/81 F

*Primary Examiner*—Edward L. Roberts

[57] ABSTRACT

A scraper for use in repairing underground pipe breaks consisting of two parallel chains carrying transverse square scraper rods.

8 Claims, 2 Drawing Sheets

WATER MAIN SCRAPER

BACKGROUND OF THE INVENTION

Underground piping for water, oil and gas has been very difficult to repair, not only because breaks are difficult to locate and must be dug out, but also because organic ground compounds bind themselves to the periphery of the pipe. It is imperative that this foreign material be removed in order to properly repair the break.

Water main piping may be cast iron, ductal iron, asbestos cement, or concrete pipe and usually 4 to 30 inches in diameter, and breaks in these pipes usually occur in a circumferential direction although in some cases they are longitudinal. After the break is located and isolated from the remainder of the system by appropriately closing adjacent shut-off valves, a hole is dug approximately 5 feet wide and 10 feet long to below the depth of the pipe.

Then, gray clay and other foreign material including organic compounds bound to the periphery of the pipe in the area of the break must be removed by scraping and chiseling. After the pipe is smooth in the area of the break, a neoprene liner is wrapped around the pipe sealing the break and a stainless steel repair sleeve, which is essentially a C clamp, is placed over the neoprene liner and sealer and clamped in position sealing the pipe and completing the repair.

Any foreign material remaining on the pipe exterior underneath the sleeve is a source of continued leakage and hence must be removed during the scraping and chiseling procedure.

One prior device to assist in scraping this foreign material from the pipe surface includes a watchband-like strip carrying a plurality of U-shaped channel-like scrapers. The watchband strip includes a plurality of plates interconnected by hinge pins that limit the pivotal movement of each plate to a single direction with respect to adjacent plates.

While this scraper provides improved scraping over the hand chiseling process, it is not possible to provide any twisting motion to the strip because it places an inordinate load on the hinge pins between the plate. Furthermore, the scraper is cumbersome because it cannot be collapsed for storage on the utility truck when not in use. Furthermore, the U-shaped scrapers, because the open end of the U faces the pipe during scraping, are proned to clogging with hard foreign material and, thus, require maintenance, and also the hinges must be lubricated regularly.

It is a primary object of the present invention to provide an improved pipe scraper that eliminates the problems noted above in prior scrapers.

SUMMARY OF THE PRESENT INVENTION

In accordance with the present invention, an improved pipe scraper is provided for use in repairing underground pipe breaks that includes two parallel chains carrying a plurality of staggered short square scraping rods and a plurality of spaced long square scraper rods.

The operators for this scraper section are a pair of equal length chains having steel loops at their ends that form handles held during the scraping operation.

This scraper is used by wrapping it around the pipe, grasping the handles with right and left hands and reciprocating the scraper back and forth on the pipe in a circumferential direction. This completely new scraper has many advantages over the prior scraper described above, one of which is that it is completely collapsible into a small pile. Another advantage is that the cutter section is replaceable without replacing the entire scraper. All of the parts of the scraper are standard stock items, including chain sections, square steel rods, and connecting links and handles.

An important aspect of the present invention is that the square scraper rods are rotationally oriented with respect to the links so that one of the points formed by the walls of the square rod extend in a direction perpendicular to the scraper chains providing improved scraping action. The square rods do not get clogged and none of the scraper or chain sections requires lubrication.

The universality of the interconnections between the links forming the scraper section and the operator sections permits the scraper to be twisted by twisting the operator handles without overloading any part of the scraper.

Frequently when a pipe breaks completely, the ends of the adjacent broken pipe ends become misaligned, and the present scraper, because of its high tensile strength, can be utilized to realign the pipes by wrapping it around one pipe end and pulling it into alignment.

A further important aspect of the present invention is that the spaced parallel chains forming the scraper section give the user greater maneuverability of the scraper section by twisting the handles.

Other objects and advantages of the present invention will appear more clearly from the following detailed description of the invention.

DETAILED DESCRIPTION OF THE PREFERRED EMBODIMENT

Figure 1:
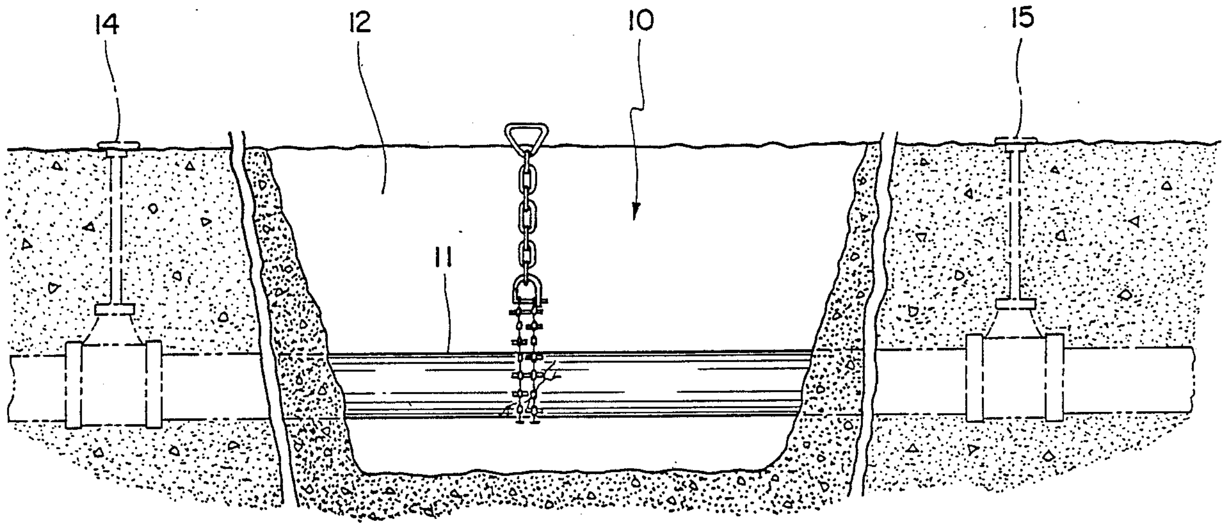
FIG. 1 is a side view of a pipe exposed for repair and the present scraper assembly illustrated in its operative position around the break.
Figure 2:
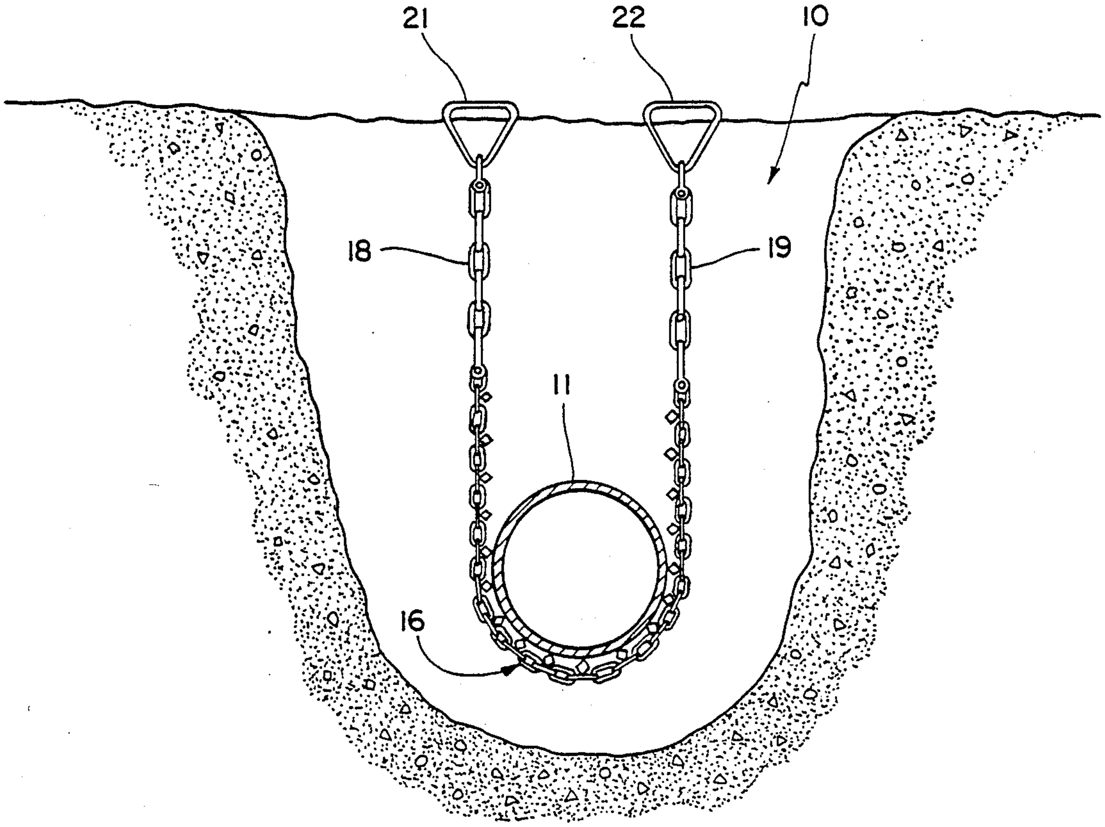
FIG. 2 is an enlarged cross-section through the repair hole illustrated in FIG. 1 with the present scraper assembly in its operative position around the pipe.

Referring to the drawings and particularly FIGS. 1 and 2, a scraper assembly 10 is illustrated according to the present invention wrapped around a water main pipe 11 in a repair hole 12 with adjacent shut-off valves 14 and 15 in their closed positions isolating the break from system pressure.

It should be understood that while the present invention is shown in connection with water main piping, that the scraper can also be utilized in the repair of gas and oil line piping.

The scraper 10 is seen to generally include a scraper section 16, operator sections 18 and 19, each carrying a handle 21 and 22. In use, the scraper assembly 10 is wrapped around the pipe as shown in FIGS. 1 and 2 and the handles 21 and 22 reciprocated up and down so the scraper 16 scrapes in a circumferential direction around the periphery of pipe 11.

Figure 3:
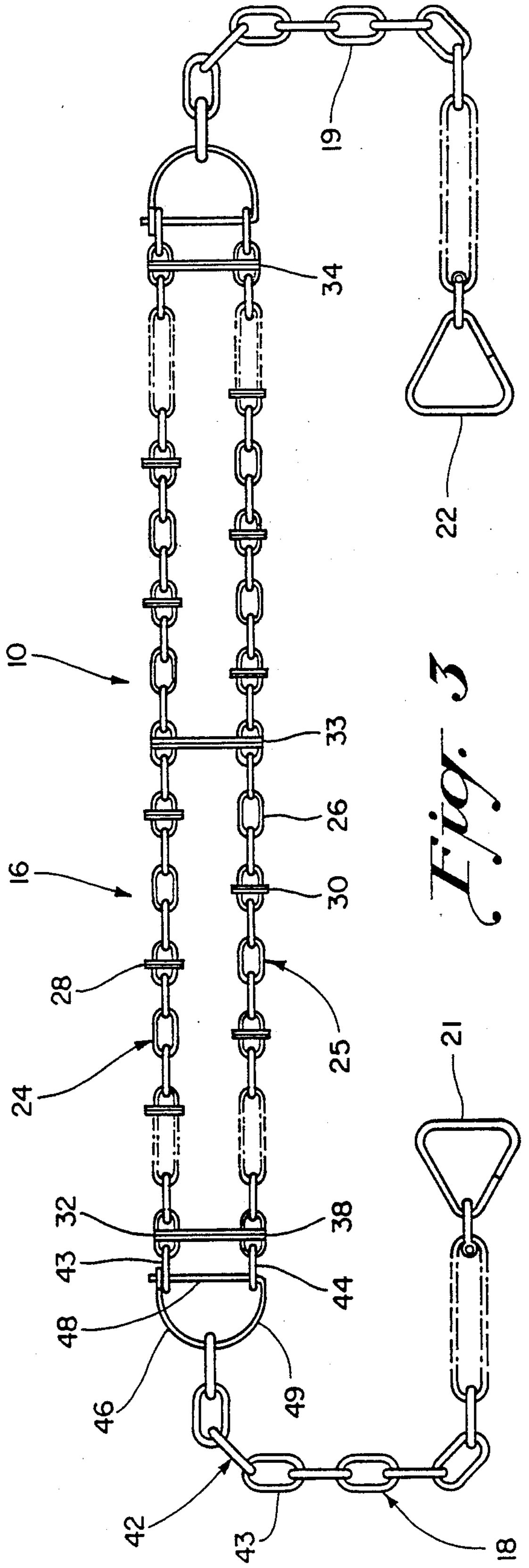
FIG. 3 is a top view of the present scraper assembly with the operator sections partly cut away.
Figure 4:
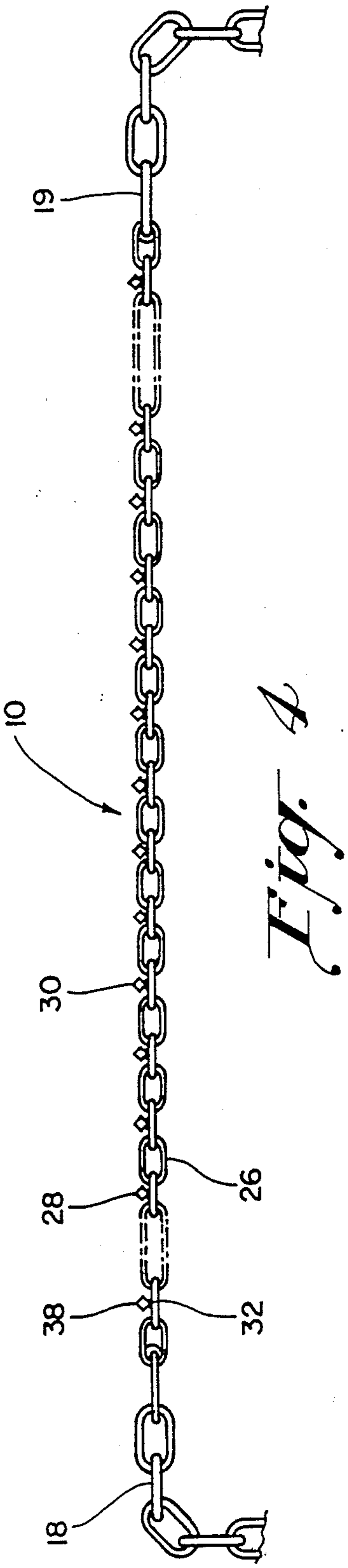
FIG. 4 is a fragmentary side view of the present scraper assembly illustrated in FIG. 3.

The scraper assembly 10 is illustrated in more detail in FIGS. 3 and 4 where the scraper section 16 is seen to include a pair of spaced parallel equal length chains 24 and 25 each including a plurality of universally interconnected $1\frac{1}{8}$th inch by $\frac{3}{8}$th inch twist links 26. Certain ones of the links 26 have short $\frac{1}{4}$ inch steel square scraper rods 28 approximately 1 inch in length welded thereto so that as seen in FIGS. 3 and 4, one of the rod edges 30 forms a point facing in a direction opposite the chains. Point 30 is the working scraping point that engages the pipe foreign material during the scraping operation. There are also three long scraper rods 32, 33 and 34 fixed to the chains 24 and 25 at the ends at mid point thereof, and these rods are also $\frac{1}{4}$ inch square but have a length of 2 inches. In a manner similar to short rods 28, rods 32, 33 and 34 are welded to the chain links so that one of the rod edges, such as shown at 38 in FIGS. 3 and 4, faces in a direction opposite the chains 24 and 25 to provide improved scraping action.

The short rods 30 are staggered betweeen chains 24 and 25 and are welded to every fourth link 26 in the chains on the links that lie in the plane of FIG. 3.

The operator sections 18 and 19 are identical and each include a chain 42 having 1 inch by $\frac{1}{4}$ inch interconnected links 43. The operator sections 18 and 19 are connected to end links 43 and 44 of chains 24 and 25 by a releasable link 46 having a straight bar portion 48 and a semi-circular hook bar portion 49.

The handles 21 and 22 are generally triangular in configuration so that any side of the handle may be the hand gripping portion thereof.

I claim:

1. A pipe scraping assembly, comprising: two spaced flexible elongated operator sections each having a handle at one end thereof, a scraper section interconnecting the other ends of the operator sections including two flexible parallel members, and a plurality of scraper members extending transverse to and fixed to the parallel members.

2. A pipe scraping assembly as defined in claim 1, wherein the parallel members each include a chain having universally interconnected links.

3. A pipe scraping assembly as defined in claim 1, wherein the operator sections each include a chain having universally interconnected links.

4. A pipe scraping assembly, comprising: a scraper section including two parallel chains each having a plurality of interconnecting links, said scraper section having a length at least half the circumference of the pipe to be scraped, a plurality of scrapers fixed to the links of the chains and extending generally transverse thereto, and two operator sections each extending from one end of the scraper section each having a handle at its distal end, whereby the scraper may be wrapped around a pipe and reciprocated in a plane transverse to the pipe direction to scrape foreign material on the surface of the pipe in preparation for break repair.

5. A pipe scraping assembly as defined in claim 4, wherein the scrapers include a plurality of square rods mounted on the links in the scraper section so the rods form a point in a direction perpendicular to the links.

6. A pipe scraping assembly as defined in claim 4, wherein the scrapers include a plurality of short square rods mounted alternately on the two scraper section chains and a plurality of long scraper rods each mounted on both of the scraper section chains.

7. A pipe scraping assembly as defined in claim 4, wherein the handles are formed by steel loops.

8. A pipe scraping assembly, comprising: a scraper section including two parallel chains each having a plurality of interconnecting links, said section having a length at least half the circumference of the pipe to be scraped, a plurality of scrapers fixed to the links of the chains and extending generally transverse thereto, two operator sections each extending from one end of the scraper section each having a handle at its distal end, whereby the scraper may be wrapped around a pipe and reciprocated in a plane transverse to the pipe direction to scrape foreign material on the surface of the pipe in preparation for break repair, the scrapers including a plurality of short square rods mounted alternately on the two scraper section chains and a plurality of long scraper rods each mounted on both of the scraper section chains, said scrapers being mounted on the scraper section chains so the rods form a point in a direction perpendicular to the links.

* * * * *